United States Patent [19]

Rastas et al.

[11] 4,362,702

[45] Dec. 7, 1982

[54] HYDROMETALLURGICAL PROCESS FOR THE TREATMENT OF A RAW MATERIAL WHICH CONTAINS OXIDE AND FERRITE OF ZINC, COPPER AND CADMIUM

[75] Inventors: Jussi K. Rastas; Jens R. Nyberg, both of Pori; Kauko J. Karpale, Ulvila; Lars-Göran Björkqvist, Espoo, all of Finland

[73] Assignee: Outokumpu Oy, Helsinki, Finland

[21] Appl. No.: 306,705

[22] Filed: Sep. 29, 1981

[30] Foreign Application Priority Data

Sep. 30, 1980 [FI] Finland .................... 803097

[51] Int. Cl.³ .................... C22B 3/00; C01G 49/06
[52] U.S. Cl. .................... 423/41; 423/109; 423/146; 423/150; 423/633
[58] Field of Search .................... 423/41, 45, 36, 109, 423/145, 146, 150, 633; 75/120, 115

[56] References Cited

U.S. PATENT DOCUMENTS

| | | | |
|---|---|---|---|
| 1,834,960 | 12/1931 | Mitchell | 75/115 |
| 3,910,784 | 10/1975 | Rastas | 75/120 |
| 3,959,437 | 5/1976 | Rastas | 423/109 |
| 3,985,857 | 10/1976 | Menendez | 423/109 |
| 4,129,454 | 12/1978 | Pavonet | 423/633 |
| 4,219,354 | 8/1980 | Rastas | 423/146 |

FOREIGN PATENT DOCUMENTS

| | | | |
|---|---|---|---|
| 851656 | 9/1970 | Canada | 75/120 |
| 977555 | 11/1975 | Canada | 423/109 |

OTHER PUBLICATIONS

Rastas et al., "Treatment of Residues in the Electrolytic Zinc Process", TMS Paper No. A73-11, (2/73), AIME, N.Y.

Lead and Zinc, vol. II, pp. 217-219, (AIME Word Symposium), AIME, N.Y., (1970).

Primary Examiner—Brian E. Hearn
Attorney, Agent, or Firm—Brooks, Haidt, Haffner & Delahunty

[57] ABSTRACT

A hydrometallurgical process for the treatment of a raw material which contains oxides and ferrites of zinc, copper and cadmium is disclosed, wherein the raw material is neutral leached by means of a sulfuric-acid-bearing solution to leach the oxides without substantial dissolving of the ferrites, a ferrite-bearing residue is separated, and a sulfuric-acid-bearing or ferrisulfate-bearing solution is mixed with the residue in order to leach the ferrite and to precipitate the iron in the form of jarosite in the presence of alkali or ammonium ions under atmospheric conditions at 80°–105° C., and the solid phase is separated from the solution. The sulfuric-acid-bearing or ferrisulfate-bearing solution is added to the ferrite-bearing residue in such an amount that approximately 50–60% of the ferrite dissolves and its iron is precipitated as jarosite, and the slurry of the solid phase is treated at such elevated pressure and temperature that the zinc of the solid phase is converted to zinc sulfate and the iron to hematite in accordance with the following reaction:

(5) $3ZnFe_2O_{4(s)} + 2A[Fe_3(SO_4)_2(OH)_6]_{(s)} \rightarrow 3ZnSO_{4(aq)} + A_2SO_{4(aq)} + 6Fe_2O_{3(s)} + 6H_2O_{(aq)}$ ($A=K$, $Na$, $NH_4$)

4 Claims, 1 Drawing Figure

LEGEND:

| | | | | |
|---|---|---|---|---|
| RA | RETURN ACID | | SE | SEPARATION OF SOLID AND SOLUTION |
| C | CALCINE | | CS-H-A | CONVERSION TO HEMATITE IN AUTOCLAVE |
| NL | NEUTRAL LEACH | | H | HEMATITE |
| 1/2 CS | SEMICONVERSION | | LR | LEACH RESIDUE |
| ReS | RETURN SOLUTION | | ▨▨▨ | SOLID PHASE |
| RS | RAW SOLUTION | | ──── | SOLUTION PHASE |

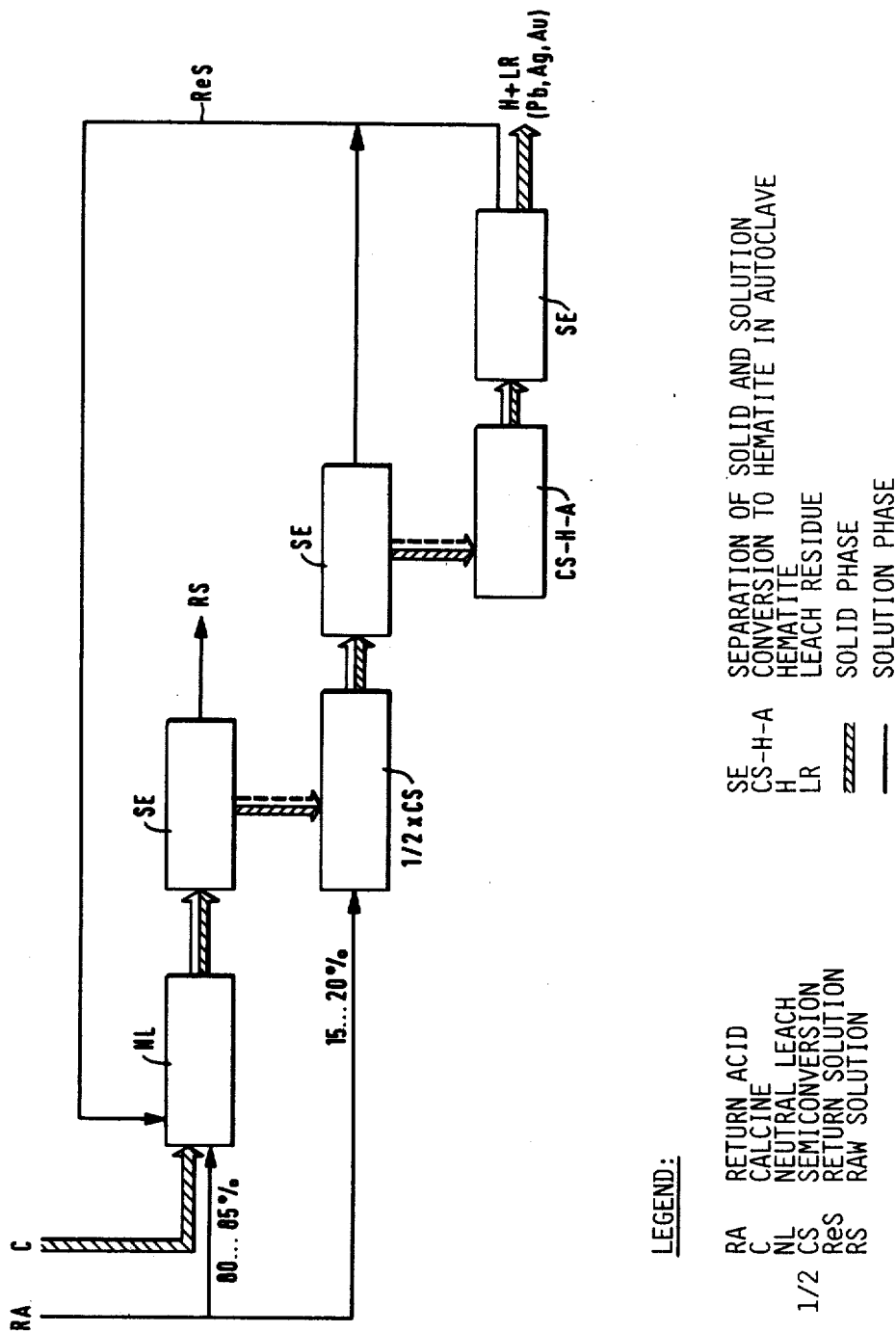

HYDROMETALLURGICAL PROCESS FOR THE TREATMENT OF A RAW MATERIAL WHICH CONTAINS OXIDE AND FERRITE OF ZINC, COPPER AND CADMIUM

BACKGROUND OF THE INVENTION

The present invention relates to a hydrometallurgical process by which the zinc-ferrite-bearing leach residue regularly appearing in connection with an electrolytic zinc process is treated so as to bring its valuable metals zinc, copper, cadmium, lead, silver and gold to a form economical to recover.

The starting material of an electrolytic zinc process is a sulfidic zinc concentrate, from which an oxidic product, zinc calcine, is obtained by roasting. This calcine contains, in addition to the principal constituent, zinc oxide, practically all of the iron of the original concentrate, combined with zinc as zinc ferrite. The iron content in the concentrate usually varies between 5 and 15%, depending on the concentrate. An iron content of about 10% in the concentrate represents a typical value of currently used raw materials. This means that about 10% of the zinc of the concentrate is bound in zinc ferrite, $ZnFe_2O_4$, the content of which in this typical case is 21.5% of the total amount of calcine.

In addition to zinc, the zinc concentrate also contains other valuable metals such as Cu, Cd, Pb, Ag and Au, and the recovery of these metals is of considerable significance for the total economy of the zinc process. However, in planning a zinc process or in modifying a process, it is necessary to take into account the behavior of several elements present in the concentrate in the process. Some of these elements (Zn, S, Cu, Cd, Pb, Ag, Au) are of primary importance for the economy of the zinc process, whereas others (Fe, Co, Ni, Ge, Tl, In, Ga, Mg, Mn, Cl, F) have less or no economic importance but have to be taken into account precisely, with regard to the functioning of the process. In addition, there are elements which are significant in terms of environmental protection (S, Hg, Se), the quality of the byproducts (Hg, Se, As, Sb, Sn), or waste formation (Fe, Si, Al, Ca).

It is of primary importance for the economy of the process that the recovery of zinc is high. In a process alternative which can be considered good at present, the target set for the recovery of zinc must be at minimum 97-98%, and also there must be a maximally good recovery of the above-mentioned valuable elements in a saleable form.

The following approximate values can be taken as average valuable-metal contents in a typical zinc concentrate: Zn 53%, Cu 0.5%, Cd 0.2%, Pb 1%, Ag 60 g/t, Au 0.5 g/t. This means that, at the current prices of the products, the total value content of copper and cadmium jointly is 4-5%, that of lead, silver and gold 8-10%, and, furthermore, the value of sulfur calculated as sulfuric acid 5-6%; i.e. the value content of the byproducts is approximately 20% of the value of zinc, which is the principal product of the said process. Thus it is evident that a maximal recovery of the said byproducts is also essential for a competitive process.

As regards the said harmful elements, especially iron, its recovery does not have special economic importance (the value of the iron as iron ore is about 0.2% of the value of the zinc) instead, the iron compounds formed during the process often cause a waste problem difficult to solve.

Prior to 1965, it was common in an electrolytic zinc process to recover the zinc present primarily as zinc oxide and zinc sulfate by means of a dilute acid leach, whereas the undissolved ferritic material constituted a leach residue, which in several cases was directed to waste disposal areas. In such cases, zinc, copper and cadmium bound in the ferrite, as well as lead, silver and gold which remained in the form of insoluble compounds under the leaching conditions were also lost in the waste disposal area along with the iron detrimental to the process. At that time, the degrees of recovery of the metals were typically 87-89% for zinc, approx. 50% for copper, 50-60% for cadmium, and 0% for lead, silver and gold. The amount of ferritic leach residue was on the average approximately one-third of the amount of calcine fed into the process. The said procedure was applied, since a suitable method was not known for the separation of the large iron amounts present in the calcine.

An essential improvement in this respect was provided by the patent applications filed in 1965 by Steintveit and by Haigh & Pickering (Norwegian Pat. No. 108047 and Australian Pat. No. 401 724). In the processes disclosed in these patent applications, the ferrites were leached and the iron was precipitated in the form of well-settling and filtrable jarosite compound. In the former process, the iron was precipitated under atmospheric conditions by using the zinc oxide of the zinc calcine for the neutralization of the sulfuric acid produced during the precipitation. In the latter process, the iron was precipitated in an autoclave, without neutralization. The jarosite process as a process in accordance with the former patent, supplemented with an acid wash (Norwegian Pat. No. 123 248), has found extensive use in the zinc industry. The process is described, for example, in G. Steintveit's article "Die Eisenfällung als Jarosit und ihre Anwendung in der Nassmetallurgie des Zinks", Erzmetall 23 (1970) 532-539.

In the jarosite process, the yield of zinc rises to 97-98%, the yield of cadmium to 90-95%, the yield of copper to 80-90%, and the yields of lead, silver and gold to 70-80%. A jarosite precipitate, the iron content of which is approximately 30% and amount somewhat less than 30% of the amount of calcine fed into the process, is removed from the process. The precipitate often—especially owing to its high annual output—constitutes a waste problem for the industrial establishment concerned. A leach residue which contains most of the lead, silver and gold of the concentrate is removed from the leaching stage of the process. The amount of the leach residue is usually approximately 5% of the amount of the calcine feed. The lead content in the residue is usually approximately 20%. The low lead content of such a leach residue and its oxidic and sulfatic composition have lowered its commercial value, and therefore it is understandable why earlier, at a time of a relatively low price level of lead and noble metals, it did not offer an especially interesting material for processing and was in many cases directed to the waste disposal area together with the jarosite precipitate.

Soon after the emergence of the jarosite process, Société de la Vieille Montagne developed the goethite process (Belgian Pat. No. 724 214). It differs from the jarosite process as regards the iron reduction stage ($Fe^{3+}\rightarrow Fe^{2+}$) and the iron precipitation stage. The iron is precipitated as goethite by using the zinc oxide of the zinc calcine for the neutralization of the sulfuric acid produced during the precipitation.

The metal yields of the goethite process are in the main the same as those of the jarosite process. The iron precipitate and the leach residue are removed from the process. The latter is similar to the leach residue of the jarosite process in both quality and quantity. The iron precipitate is in this case goethite-based, and its iron content is approximately 45–48%. Its amount is clearly less than that of the corresponding precipitate in the jarosite process, but even in this case it is nearly 20% of the amount of the zinc calcine feed. The goethite process has been described in the article by J. N. André and N. J. J. Masson "The Goethite Process in Retreating Zinc Leaching Residues", AIME Annual Meeting, Chicago, February 1973.

As is evident from the above brief descriptions of the processes, both the jarosite and the goethite process produce relatively large amounts of iron precipitate, which is not suitable for, for example, the production of crude iron without further treatment, and for which no other use has been found, but the precipitates have as a rule been directed to waste disposal areas.

The attempt to diminish the waste problem has lead to a search for process alternatives in which the iron can be separated in the form of sufficiently pure hematite with the purpose of channeling it to the iron industry as raw material. On this basis, there have been developed the hematite processes, in which the iron is precipitated as hematite out from the process solution during an autoclave stage. The first hematite process was developed by The Dowa Mining Company, and the process is in use at a zinc plant in Iijima, Japan. The process has been described in the article by S. Tsunoda, J. Maeshiro, E. Emi, K. Sekine "The Construction and Operation of the Iijima Electrolytic Zinc Plant", TMS Paper Selection AIME A-73-65 (1973).

Another hematite process was recently developed by Ruhr-Zink GmbH in the Federal Republic of Germany. The process has been described in DT-OS 26 24 657 and DT-OS 26 24 658 and in the article by A. von Röpenack "Die Bedeutung der Eisenfällung für die hydrometallurgische Zinkgewinnung", Erzmetall Bd 32 (1979) 272–276.

Outokumpu Oy has developed a process based on the utilization of jarosite compounds, i.e. the conversion process, in which special attention has been paid to a high recovery of zinc, copper and cadmium and to the simplification of the process for leaching the zinc calcine. The process has been in use at the Kokkola zinc plant of Outokumpu Oy since 1973. At the time that the process was adopted, the raw material of the plant was so low in lead, silver and gold that the recovery of these elements did not seem economically advisable at the then prevailing relative prices. On the other hand, it was viewed as advisable to aim at a maximally high recovery of the zinc, copper and cadmium present in the concentrate and at simplicity of the apparatus and the processing method. It was proven that by giving up the individual separation of the leach residue which contained lead and noble metals, normally carried out in connection with the previously described jarosite process, it was possible to combine the stages normally included in the jarosite process—ferrite leach, (preneutralization), jarosite precipitation and acid wash of jarosite precipitate—to form one stage in which the ferrite dissolves (consuming acid) and the iron simultaneously precipitates as jarosite (producing acid) and thereby to simplify the process of leaching zinc calcine. In this case the reactions (1) and (2) representing the phenomena occurring in the process (1) $3ZnFe_2O_{4(s)} + 12H_2SO_{4(aq)} \rightleftarrows 3ZnSO_{4(aq)} + 3Fe_2(SO_4)_{3(aq)} + 12H_2O_{(aq)}$ (2) $3Fe_2(SO_4)_{3(aq)} + Na_2SO_{4(aq)} + 12H_2O_{(aq)} \rightleftarrows 2Na[Fe_3(SO_4)_2(OH)_6]_{(s)} + 6H_2SO_{4(aq)}$ (3) $3ZnFe_2O_{4(s)} + 6H_2SO_{4(aq)} + Na_2SO_{4(aq)} \rightleftarrows 2Na[Fe_3(SO_4)_2(OH)_6]_{(s)} + 3ZnSO_{4(aq)}$ are in mutual interaction and form a sum reaction (3), in which the zinc of the zinc ferrite passes into the solution and the iron is converted during the same stage via the solution to the jarosite phase. The leach yields and total yields of zinc are respectively 98–99% and 97.5–98.5%, and the total yields of copper and cadmium are 85–90%. The process is described in Finnish Patent Application 410/73 and in the articles by T. L. Huggare, S. Fugleberg, J. Rastas "How Outokumpu Conversion process raises Zinc recovery", World Min. (1974) 36–42 and by J. Rastas, S. Fugleberg, L-G. Björkqvist, R-L. Gisler "Kinetik der Ferritlaugung und Jarositfällung" Erzmetall Bd. 32 (1979) 117–125.

On the one hand, as the raw material range has come to contain more lead, silver and gold than previously, and on the other hand, as the changes in the relative prices of these metals—especially those of the noble metals—nowadays make it necessary to plan the leach process of the zinc calcine so that, in addition to a high recovery of zinc, copper and cadmium, a corresponding recovery is achieved also regarding lead, silver and gold.

In the jarosite and goethite processes summarized above, there is produced during a hot acid leaching stage a leach residue which no longer contains ferrites but contains all of the lead, silver and gold contained in the calcine fed to the neutral leaching stage. The lead content of this leach residue is in general relatively low, often about 20%. The low lead content of the residue and its oxidic and sulfatic composition decrease its commercial value. Therefore, it is understandable that processes by which the lead, silver and gold can be obtained in a more saleable form have been developed for the further treatment of this leach residue—originally intended for sale.

Such processes have been introduced by Asturiana De Zinc S. A. in their Finnish Patent Applications 3435/70 and 214/74 and by Société des Mines et Fonderies de Zinc de la Vieille Montagne in their Finnish Patent Application 761582.

An examination of the jarosite, goethite and hematite processes briefly described previously shows that they are all relatively complicated multiple-stage processes. Each of them includes a hot acid leach of the neutral leach residue—in some processes it is carried out in a reducing milieu—producing a leach residue which contains the lead, silver and gold of the calcine fed to the neutral leach stage. As stated above, in order to raise the commercial value of this residue, there have been developed methods by means of which the lead, silver and gold present in the residue can be brought to a form more saleable than previously. Linking such processes to the original processes however, makes their previously complex structure even more complex. It has proven to be necessary to seek new alternatives which would lead to implementation simpler than the previous ones in total processes.

Finnish Patent Application No. 80 3096 discloses an alternative process for the recovery of lead, silver and gold in connection with the process for leaching zinc calcine, the basic process being carried out in accordance with the method disclosed in Finnish Patent Application 410/73. The valuable materials present in the calcine, zinc, copper, cadmium, lead, silver and gold, can thereby be recovered by means of a relatively simple total process. It must be noted, however, that even in this alternative the iron emerging from the process is removed in the form of a jarosite compound. So far, no suitable use has been found for the jarosite compound, and so it must normally be transported to waste disposal areas. On the other hand, the jarosite compound—being a mineral also present in nature—is no problem waste in terms of environmental protection, provided that the industry concerned has enough land area suitable for waste disposal. However, in many cases it is considered an advantage if the iron emerging from the process can be brought to a hematite form, since it is easier to find suitable further uses for hematite than for jarosite.

Finnish Pat. No. 50141 discloses a process for producing a raw material suitable for iron production from a precipitate derived from electrolytic production of zinc, the precipitate containing primarily alkalic sulfates of iron and zinc ferrite. The process is characterized in that the precipitate, slurried in water or a dilute sulfuric acid solution is treated hydrothermally at elevated temperature and pressure in such a manner that the stability range of hematite, $Fe_2O_3$, is maintained in the system $Fe_2O_3$-$SO_3$-$H_2O$, whereafter the hematite-bearing solid, suitable for iron production, is separated from the sulfuric-acid-bearing solution which contains metal sulfates.

The object of the present invention is to eliminate the disadvantages of the above-mentioned processes and to provide a leach process for zinc calcine, a process in which iron is recovered in hematite form. The hematite precipitate contains the lead, silver and gold of the zinc concentrate in such a form that their recovery can be carried out by a chloride leach process known per se, or advantageously by the sulfidization and froth-flotation process according to Finnish Patent Application No. 80 3096.

SUMMARY OF THE INVENTION

According to the invention there is provided a process in which sulfuric-acid-bearing or ferrisulfate-bearing solution is added to the ferrite-bearing residue in such an amount that approximately 50–60% of the ferrite dissolves and its iron is precipitated as jarosite, and the slurry of the solid phase is treated at such elevated pressure and temperature that the zinc of the solid phase is converted to zinc sulfate and the iron to hematite in accordance with the following reaction:

(5) $3ZnFe_2O_{4(s)} + 2A[Fe_3(SO_4)_2(OH)_6]_{(s)} \rightarrow 3ZnSO_{4(aq)} + A_2SO_{4(aq)} + 6Fe_2O_{3(s)} + 6H_2O_{(aq)}$ (A=K, Na, NH$_4$)

DESCRIPTION OF THE DRAWING

The FIGURE illustrates diagrammatically the leach system for zinc calcine in accordance with the invention.

DESCRIPTION OF THE PREFERRED EMBODIMENT

In the process of the FIGURE, the entire calcine feed is directed to a neutral leach stage (NL). The neutral leach can be carried out in one or two stages (Finnish Patent Application Nos. 410/73 and 760486), and the two-stage leach, for its part, either as a countercurrent or a cocurrent leach (Finnish Patent Application No. 410/73). From the separation stage (preferably thickening) connected with the neutral leach, the solution (raw solution) is directed to a semi-conversion stage ($\frac{1}{2} \times CS$). To this stage there is a fed a return acid amount (or ferrisulfate amount) which, first, is equivalent with regard to the zinc ferrite fed into the stage in accordance with Reaction (4 or 4a)

(4) $6ZnFe_2O_{4(s)} + A_2SO_{4(aq)} + 6H_2SO_{4(aq)} \rightarrow 3ZnSO_{4(aq)} + 3ZnFe_2O_{4(s)} + 2A[Fe_3(SO_4)_2(OH)_6]_{(s)}$ (4a) $9ZnFe_2O_{4(s)} + 2A_2SO_{4(aq)} + 3Fe_2(SO_4)_{3(aq)} + 12H_2O_{(aq)} \rightarrow 3ZnSO_{4(aq)} + 6ZnFe_2O_{4(s)} + 4A[Fe_3(SO_4)_2(OH)_6]_{(s)}$  A=K, Na, NH$_4$ and, second, adjusts the concentration of sulfuric acid in the solution at the end of the stage to between 20 and 40 kg/m$^3$ [in connection with Reaction (4a) through the reaction $3Fe_2(SO_4)_{3(aq)} + A_2SO_{4(aq)} + 12H_2O_{(aq)} \rightarrow 2A[Fe_3(SO_4)_2(OH)_{6(s)}] + 6H_2SO_{4(aq)}$]. During this stage, the most finely divided fraction of the zinc ferrite reacts rapidly, and Reaction (4 or 4a) can be caused to take place in a relatively small reactor volume, which is evident from the laws governing the dissolving of the zinc ferrite and the precipitation of jarosite, as presented in the article by J. Rastas, S. Fugleberg, L-G. Björkqvist, R-L. Gisler "Kinetik der Ferritlaugung und Jarositfällung", Erzmetall Bd. 32 (1979) 117–125 and is also evident if it is taken into account that only approximately 15–20% of the return acid fed into the entire process is directed to the semi-conversion stage and most of it, 80–85%, is fed to the neutral leach stage. The sulfate of sodium or ammonium, included in Reaction Equation (4), cycles along with the process solution and is bound during the semi-conversion stage in the jarosite compound and is released again into the solution during the following (CS-H-A) stage [Reaction (5)]. From the separation stage (preferably thickening) connected with the semiconversion the solution is directed to the neutral leach and the solid phase—for example, in the form of a thickened slurry—is directed to the following process stage (CS-H-A). This process stage is carried out in an autoclave, in which the temperature of the slurry is raised to between 220° and 250° C. In this case, Reaction (5) occurs in the autoclave (5) $3ZnFe_2O_{4(s)} + 2A[Fe_3(SO_4)_2(OH)_6]_{(s)} \rightarrow 3ZnSO_{4(aq)} + A_2SO_{4(aq)} + 6Fe_2O_{3(s)} + 6H_2O_{(aq)}$  A=K, Na, NH$_4$ For the process it is important that the ratio of zinc ferrite to jarosite in the solid material fed into the autoclave is correct. When adjusting the ferrite/jarosite ratio in the feed mixture, it is preferable to proceed so that the amount of jarosite is somewhat overproportioned in relation to the amount of ferrite with regard to Reaction (5), and in that case jarosite decomposes in the autoclave according to Reaction (6)

(6) $2A[Fe_3(SO_4)_2(OH)_6]_{(s)} \rightarrow A_2SO_{4(aq)} + 3Fe_2O_{3(s)} + 3H_2SO_{4(aq)} + 3H_2O_{(aq)}$ By controlling the jarosite/ferrite ratio, the solid/solution ratio in the feed, the ratio of the volume of the autoclave to the volume of the mixture entering the autoclave (reaction period), and the temperature it is possible to adjust the reaction conditions in the autoclave so that Reactions (5) and (6) occur rapidly enough and completely. It should be noted that the concentration of solid in the reaction mixture can be raised to quite a high level—e.g. 1000 kg/m$^3$—since the nature of the solution phase is mainly one which promotes the transfer of heat and the progress of the reactions.

Sum Reaction (7) of Reactions (4) and (5)

(7) $6ZnFe_2O_{4(s)} + 6H_2SO_{4(aq)} \rightarrow 6ZnSO_{4(aq)} + 6Fe_2O_{3(s)} + 6H_2O_{(aq)}$ can also be caused to occur directly in the autoclave. In this case, there is fed into the autoclave such an amount of sulfuric acid—in the form of return acid—with regard to the amount of zinc ferrite that it suffices to carry out Reaction (7) and, in addition, to ensure that the concentration of sulfuric acid in the solution at the end of the stage is between 20 and 80 kg/m$^3$. In this alternative, the semiconversion ($\frac{1}{2} \times CS$) and the separation stage linked with it can be eliminated. However, it should be noted that the flow through the autoclave in this case is approximately double that of the alternative process based on the utilization of Reaction (5).

In addition to Reaction (7), it is also advisable to examine Reaction (8)

(8) $6ZnFe_2O_{4(s)} + 2Fe_2(SO_4)_{3(aq)} \rightarrow 6ZnSO_{4(aq)} + 8Fe_2O_{3(s)}$ in which the sulfate is yielded to the zinc of the zinc ferrite by ferrisulfate. Reaction (8) can be utilized—in a manner similar to that of using Reaction (7)—when treating zinc ferrite in an autoclave with the aim of causing the zinc of the ferrite to pass into the solution in the form of zinc sulfate and the iron to pass into the solid phase as hematite.

When Reaction (5) is utilized, it can be taken into account that the jarosite appearing in Reaction Equation (5) can be previously formed jarosite which has been taken to a waste disposal area. In this case, the zinc ferrite of the ferritic leach residue emerging from the neutral leach stage and the jarosite of the jarosite precipitate taken from the waste disposal area are proportioned in such a manner that the proportion of jarosite to the proportion of zinc ferrite is sufficient according to Reaction (5) and overproportioned to such an extent that, by means of the sulfuric acid amount produced according to Reaction (6), the concentration of sulfuric acid in the solution at the end of the autoclave stage can be adjusted to between 20 and 80 kg/m$^3$. In this alternative, also, the semi-conversion ($\frac{1}{2} \times CS$) and the separation stage connected with it are not necessary. In all the cases presented, however, it is necessary to remove the excess sulfate of the process by means of a sulfate removal method known per se. and used in connection with a zinc process.

When the leaching process is carried out by one of the methods described above, the lead, silver and gold present in the zinc calcine, and in the last-mentioned case also in the jarosite precipitate, pass completely into the hematite precipitate emerging from the process. In the precipitate the lead is in the form of lead sulfate and the silver partly in the form of chloride and partly in the form of sulfide. The lead, silver and gold can be recovered from the hematite precipitate either by the chloride leaching process known per se or very advantageously by the sulfidization and froth-flotation process disclosed in Finnish Patent Application 80 3096.

By this leaching process for zinc calcine it is possible to recover very advantageously the valuable materials of the zinc calcine: zinc, copper, cadmium, lead, silver and gold.

The process according to the invention and the results achieved by it are described in the following examples.

EXAMPLE 1

Reaction (5), in which A=NH$_4$, was utilized in this experiment. The zinc ferrite was derived from the ferritic leach residue obtained from a neutral leach, and the ammonium jarosite was derived from jarosite precipitate taken from a waste disposal area.

The experiment was performed as follows: 800 g of ferritic leach residue and 1600 g of jarosite precipitate were fed into the autoclave, into which 2 l of water and 400 g of ZnSO$_4$.7H$_2$O were also added. Thereafter followed a heating stage during which intermediate samples were taken. When the temperature was 240° C., the O$_2$-pressure was adjusted to a value of 2 bar. Table 1 shows how Reaction (5) progressed. The high concentration of zinc in the final precipitate is due to the fact that the amount of jarosite remained somewhat underproportioned in regard to the zinc ferrite amount.

EXAMPLE 2

Reaction (8) was utilized in this experiment. 200 g of ferritic leach residue, 200 g of Fe(SO$_4$)$_3$, about 2 l of water, and 200 g of ZnSO$_4$.7H$_2$O were fed into the autoclave. Thereafter, the temperature was raised to 240° C. The reaction period at 240° C. was 2 h. The results of the experiment are shown in Table 2.

EXAMPLE 3

Reaction (7) was utilized in this experiment. 200 g of ferritic leach residue, 2 l of a sulfuric acid solution having a sulfuric acid concentration of 100 g/l, and 200 g ZnSO$_4$.7H$_2$O were fed into the autoclave. The temperature was raised to 240° C. The reaction period at 240° C. was 3 h. The results of the experiment are given in Table 3.

EXAMPLE 4

The effect of temperature on the reaction speed was studied. 400 g of precipitate from the $\frac{1}{2} \times CS$ stage (containing zinc ferrite and jarosite) and 2 l of a sulfuric acid solution having a sulfuric acid concentration of approximately 30 g/l were fed into the autoclave. The temperature was raised in each experiment to 200° C., 220° C. and 240° C. The results are shown in Tables 4-6.

EXAMPLE 5

All of the ferrite did not react in Example 1. The present example shows that ferrite does react if a sufficient amount of jarosite is used. 200 g of ferritic leach residue, 600 g of jarosite precipitate, 2 l of water, 40 g of Fe$_2$(SO$_4$)$_3$, and 200 g of Zn SO$_4$.7H$_2$O were fed into the autoclave. The temperature was raised to 240° C. The results are shown in Table 7.

EXAMPLE 6

This example shows that Reactions (5), (7) and (8) can be utilized simultaneously. The results of the experiment are shown in Table 8.

EXAMPLE 7

The experiment series (Tables 9-13) relating to this Example shows that, when the temperature rises, jarosite is formed first (the concentrations of S, Na and NH$_4$ in the solid phase increase) and only at the time that the jarosite begins to decompose the reaction progresses also with regard to zinc ferrite (the concentrations of Zn, S, Na and $NH_4$ in the solid phase decrease). In all of the experiments 200 g of ferritic leach residue, 150 g of $Fe_2(SO_4)_3$, 2 l of a solution having a sulfuric acid concentration of 45 g/l, and 200 g of $ZnSO_4.7H_2O$ were fed into the autoclave. In the experiment of Table 9, the temperature was 240° C., in the experiment of Table 10, it was 220° C. In the experiment of Table 11 the temperature was 220° C., but in addition to the above-mentioned substances, 35 g of $Na_2SO_4$ was added into the autoclave. In the experiment of Table 12 the temperature was 240° C. and the addition of $Na_2SO_4$ was 35 g. In the experiment of Table 13 the temperature was 240° C. and the addition of $(NH_4)_2SO_4$ was 35 g. The results of the experiments show that the formed jarosite did not have time to decompose completely in all experiments. Sodium jarosite decomposes more slowly than the respective ammonium compound. The elevation of the temperature accelerates decomposition.

TABLE 1

Relates to Example 1

Starting Material

| 800 g of ferritic leach residue | Zn % | Fe % | Pb % | S % | $SiO_2$ % |
|---|---|---|---|---|---|
| | 21.2 | 41.2 | 4.4 | 0.87 | 2.0 |

| 1600 g of jarosite precipitate | Pb % | Fe % | Ca % | Zn % | $SiO_2$ % | S % |
|---|---|---|---|---|---|---|
| | 3.2 | 25.2 | 4.2 | 1.9 | 3.0 | 13.6 |

V = 2 l
400 g $ZnSO_4.7H_2O$

| T °C. | t h | $P_{O2}$ bar | Zn % | Fe % | S % | Pb % | $SiO_2$ % | Ca % | $NH_4$ % | Na % | Zn g/l | $Fe_{total}$ g/l | $Fe^{2+}$ mg/l | $H_2SO_4$ g/l | $SiO_2$ mg/l | Na mg/l | $NH_4$ g/l |
|---|---|---|---|---|---|---|---|---|---|---|---|---|---|---|---|---|---|
| 25 | | | 8.4 | 31.5 | 8.9 | 3.8 | 2.8 | 2.4 | 1.2 | 0.24 | 34.0 | 0.04 | | 1.0 | 160 | 56 | 0.08 |
| 100 | | | 8.4 | 31.0 | 9.0 | 3.8 | 2.3 | 2.5 | 1.3 | 0.23 | 37.0 | <0.01 | | 1.0 | 26 | 62 | 0.09 |
| 150 | | | 8.6 | 31.0 | 8.9 | 3.7 | 2.5 | 2.6 | 1.3 | 0.24 | 29.0 | <0.01 | | 0.79 | 680 | 54 | |
| 240 | 0 | 2 | 7.5 | 40.5 | 6.2 | 5.2 | 3.4 | 4.0 | 0.26 | 0.08 | 70.0 | 10 | 5700 | 33.8 | 1440 | 1940 | |
| 240 | 0.5 | 2 | 4.1 | 45.0 | 5.2 | 5.6 | 3.7 | 4.6 | 0.04 | 0.04 | 80.0 | 6 | 3800 | 26.2 | 1560 | 1920 | 7.8 |
| 240 | 1 | 2 | 3.8 | 44.5 | 5.1 | 5.5 | 3.8 | 4.5 | 0.03 | 0.04 | 88.0 | 5.6 | 4400 | 14.6 | 1840 | 2080 | 7.2 |
| 240 | 2 | 2 | 3.5 | 44.5 | 5.1 | 5.5 | 3.8 | 4.7 | 0.03 | 0.05 | 88.0 | 4.72 | 3600 | 25.2 | 1640 | 1960 | 7.8 |
| 240 | 3 | 2 | 3.4 | 45.0 | 5.0 | 5.6 | 3.8 | 4.7 | 0.03 | 0.04 | 86.0 | 4.52 | 3400 | 22.0 | 1640 | 1880 | 7.0 |

| X-ray diffraction of final precipitate | t h | $PbSO_4$ % | $SiO_2$ % | $ZnFe_2O_4$ % | $CaSO_4$ % | Jaros. % | $Fe_2O_3$ % | |
|---|---|---|---|---|---|---|---|---|
| $Fe_2O_3$, $PbSO_4$, $ZnFe_2O_4$ $SiO_2$ | 0 | 7.6 | 3.4 | 27.7 | 13.6 | 16.6 | 31.4 | Σ = 100.3 |
| | 0.5 | 8.2 | 3.7 | 15.1 | 15.6 | 4.9 | 51.9 | Σ = 99.4 |
| | 3 | 8.2 | 3.8 | 12.6 | 16.0 | 2.8 | 54.6 | Σ = 98% |

TABLE 2

Relates to Example 2

Starting material

| 200 g of ferritic leach residue | Zn % | Fe % | Pb % | S % | $SiO_2$ % |
|---|---|---|---|---|---|
| | 19.2 | 38.0 | 6.7 | 1.9 | 4.0 |

200 g $Fe_2(SO_4)_3$
V = 2 l
200 g $ZnSO_4.7H_2O$

| T °C. | t h | $P_{O2}$ bar | Zn % | Fe % | S % | Pb % | $SiO_2$ % | Ca % | Zn g/l | $Fe_{total}$ g/l | $Fe^{2+}$ g/l | $H_2SO_4$ g/l | $SiO_2$ g/l |
|---|---|---|---|---|---|---|---|---|---|---|---|---|---|
| 240 | 0 | 0 | | | | | | | | | | | |
| 240 | 0.5 | 0 | 8.9 | 39.0 | 6.1 | 5.5 | | | 23.0 | 5.7 | 4.4 | 24.4 | |
| 240 | 1 | 0 | 1.5 | 55.0 | 2.2 | 6.7 | | | 26.0 | 1.7 | 1.6 | 24.1 | |
| 240 | 2 | 0 | 0.6 | 56.0 | 2.1 | 7.0 | | 0.05 | 33.0 | 6.4 | 5.9 | 16.2 | |

| X-ray diffraction of final precipitate | t h | $PbSO_4$ % | $SiO_2$ % | $ZnFe_2O_4$ % | Jaros. % | $Fe_2O_3$ % | |
|---|---|---|---|---|---|---|---|
| a-$Fe_2O_3$ $PbSO_4$ | 0 | | | | | | |
| | 0.5 | | | | | | |
| | 1 | | | | | | |
| | 2 | 10.2 | | 2.2 | 6.2 | 75.5 | Σ = 94.1% |

TABLE 3

Relates to Example 3

Starting material

| 200 g of ferritic leach residue | Zn % | Fe % | Pb % | S % | $SiO_2$ % |
|---|---|---|---|---|---|
| | 19.2 | 38.0 | 6.7 | 1.9 | 4.0 |

V = 2 l [$H_2SO_4$] = 100 g/l
200 g $ZnSO_4.7H_2O$

TABLE 3-continued

Relates to Example 3

| T °C. | t h | $P_{O_2}$ bar | Zn % | Fe % | S % | Pb % | $SiO_2$ % | Zn g/l | $Fe_{total}$ g/l | $Fe^{2+}$ mg/l | $H_2SO_4$ g/l | $SiO_2$ mg/l |
|---|---|---|---|---|---|---|---|---|---|---|---|---|
| 25  |     |   | 20.9 | 40.0 | 1.0 | 4.8 | 2.9 | 21.6 | 0.46 |      | 90 | <100 |
| 100 |     |   | 20.0 | 39.0 | 1.4 | 6.0 | 3.3 | 26.0 | 7.2  |      | 68 | 120 |
| 150 |     |   | 19.2 | 38.0 | 1.8 | 7.2 | 3.7 | 29.4 | 13.4 |      | 46 | 280 |
| 240 | 0   | 2 | 13.7 | 38.0 | 4.8 | 6.1 | 1.5 | 33.4 | 5.6  | 2800 | 66 | 1340 |
| 240 | 0.5 | 2 | 11.8 | 39.0 | 5.3 | 5.6 | 1.4 | 37.8 | 2.1  | 54   | 72 | 1520 |
| 240 | 1   | 2 | 4.5  | 45.0 | 5.8 | 5.8 | 1.4 | 47.2 | 1.0  | 27   | 63 | 1580 |
| 240 | 2   | 2 | 0.7  | 53.0 | 3.9 | 6.1 | 1.6 | 51.0 | 0.48 | —    | 59 | 1500 |
| 240 | 3   | 2 | 0.4  | 57.0 | 2.1 | 6.2 | 1.7 | 53.0 | 0.3  | 27   | 69 | 1600 |

| X-ray diffraction of final precipitate | t h | $PbSO_4$ % | $SiO_2$ % | $ZnFe_2O_4$ % | Jaros. % | $Fe_2O_3$ % | |
|---|---|---|---|---|---|---|---|
| $\alpha$-$Fe_2O_3$<br>$PbSO_4$ | 3 | 9.1 | 1.7 | 1.5 | 8.7 | 76.3 | $\Sigma = 97.3\%$ |

TABLE 4

Relates to Example 4

Starting material

| 400 g of precipitate from stage $\frac{1}{2}$ × CS | $Zn_w$ % | $SO_{4w}$ % | Fe % | $Zn_{total}$ % | Na % | Ca % | Pb % | $SO_{4total}$ % | $NH_4$ % | $SiO_2$ % |
|---|---|---|---|---|---|---|---|---|---|---|
|  | 5.2 | 15.1 | 24.0 | 12 | 0.13 | 1.3 | 1.7 | 28.7 | 1.3 | 2.9 |

V = 2 l  [$H_2SO_4$] = 30 g/l

| T °C. | t h | $P_{O_2}$ bar | Zn % | Fe % | S % | Pb % | $SiO_2$ % | Ca % | Zn g/l | $Fe_{total}$ mg/l | $Fe^{2+}$ mg/l | $H_2SO_4$ g/l | $SiO_2$ mg/l |
|---|---|---|---|---|---|---|---|---|---|---|---|---|---|
| 240 | 0   | 2 |      |      |     |     |     |     |      |    |    |      |      |
| 240 | 0.5 | 2 | 0.78 | 53.0 | 3.6 | 9.5 | 3.3 | 2.1 | 24.8 | 70 |    | 26.4 | 1760 |
| 240 | 1   | 2 | 0.65 | 53.0 | 3.4 | 9.6 | 3.1 | 2.0 | 24.8 | 50 |    | 25.2 | 1760 |
| 240 | 2   | 2 | 0.61 | 53.0 | 3.3 | 9.6 | 3.5 | 2.0 | 20.8 | 40 |    | 24.4 | 1760 |
| 240 | 3   | 2 | 0.47 | 55.0 | 3.0 | 8.9 | 4.1 | 1.6 | 21.6 | 40 |    | 21.7 | 1500 |

| X-ray diffraction of final precipitate | t h | $PbSO_4$ % | $SiO_2$ % | $ZnFe_2O_4$ % | $CaSO_4$ % | Jaros. % | $Fe_2O_3$ % | |
|---|---|---|---|---|---|---|---|---|
| $\alpha$-$Fe_2O_3$<br>$PbSO_4$<br>$CaSO_4$ | 3 | 13.0 | 4.1 | 1.7 | 5.4 | 2.7 | 76.2 | $\Sigma = 103.1$ |

TABLE 5

Relates to Example 4

Starting material

| 400 g of precipitate from stage $\frac{1}{2}$ × CS | $Zn_w$ % | $SO_{4w}$ % | Fe % | $Zn_{total}$ % | Na % | Ca % | Pb % | $SO_{4total}$ % | $NH_4$ % | $SiO_2$ % |
|---|---|---|---|---|---|---|---|---|---|---|
|  | 5.2 | 15.1 | 24.0 | 12 | 0.13 | 1.3 | 1.7 | 28.7 | 1.3 | 2.9 |

V = 2 l  [$H_2SO_4$] = 30 g/l

| T °C. | t h | $P_{O_2}$ bar | Zn % | Fe % | S % | Pb % | $SiO_2$ % | Ca % | Na % | $NH_4$ % | Zn g/l | $Fe_{total}$ g/l | $Fe^{2+}$ g/l | $H_xSO_4$ g/l | $SiO_2$ mg/l | Na mg/l | $NH_4$ g/l |
|---|---|---|---|---|---|---|---|---|---|---|---|---|---|---|---|---|---|
| 25  |     |   | 10.3 | 35.0 | 6.6 | 2.4 | 3.8 | 0.45 | 0.17 | 2.0 | 7.6  | 0.46  |       | 28.8 | 140  | 55  | 0.18 |
| 100 |     |   | 10.3 | 35.0 | 7.1 | 2.5 | 3.8 | 0.65 | 0.18 | 2.0 | 9.0  | 1.96  |       | 27.0 | <100 | 60  | 0.25 |
| 150 |     |   | 9.5  | 35.0 | 7.1 | 2.5 | 3.7 | 0.12 | 0.19 | 2.0 | 10.8 | 1.24  |       | 23.1 | 240  | 45  | 0.23 |
| 220 | 0   | 2 | 9.2  | 34.0 | 8.0 | 2.9 | 2.8 | 1.1  | 0.18 | 1.8 | 12.4 | 6.0   |       | 26.5 | 1260 | 80  | 0.60 |
| 220 | 0.5 | 2 | 7.4  | 39.0 | 6.9 | 2.9 | 2.9 | 1.7  | 0.16 | 1.4 | 16.4 | 0.9   |       | 30.4 | 1600 | 125 | 1.1 |
| 220 | 1   | 2 | 5.6  | 41.0 | 6.0 | 3.1 | 3.1 | 1.6  | 0.13 | 1.0 | 19.8 | 0.7   |       | 34.6 | 1640 | 180 | 1.4 |
| 220 | 2   | 2 | 2.6  | 51.0 | 3.7 | 3.5 | 3.5 | 1.9  | 0.06 | 0.1 | 24.6 | 0.275 |       | 33.5 | 1460 | 285 | 2.1 |
| 220 | 3   | 2 | 0.9  | 51.0 | 3.2 | 3.7 | 3.8 | 2.0  | 0.04 | <0.1| 26.8 | 0.1   |       | 30.9 | 1460 | 310 | 2.1 |

| X-ray diffraction of final precipitate | t h | $PbSO_4$ % | $SiO_2$ % | $ZnFe_2O_4$ % | $CaSO_4$ % | Jaros. % | $Fe_2O_3$ % | |
|---|---|---|---|---|---|---|---|---|
| $Fe_2O_3$, $PbSO_4$<br>$CaSO_4$ | 3 | 5.4 | 3.8 | 3.3 | 6.8 | 7.8 | 66.9 | $\Sigma = 94\%$ |

TABLE 6

Relates to Example 4

Starting material

| 400 g of precipitate from stage $\frac{1}{2}$ × CS | $Zn_w$ % | $SO_{4w}$ % | Fe % | $Zn_{total}$ % | Na % | Ca % | Pb % | $SO_{4total}$ % | $NH_4$ % | $SiO_2$ % |
|---|---|---|---|---|---|---|---|---|---|---|
|  | 5.2 | 13.1 | 24.0 | 12 | 0.13 | 1.3 | 1.7 | 28.7 | 1.3 | 2.9 |

V = 2 l  [$H_2SO_4$] = 30 g/l

| T | t | $P_{O_2}$ | Zn | Fe | S | Pb | $SiO_2$ | Ca | Na | $NH_4$ | Zn | $Fe_{total}$ | $Fe^{2+}$ | $H_2SO_4$ | $SiO_2$ | Na | $NH_4$ |
|---|---|---|---|---|---|---|---|---|---|---|---|---|---|---|---|---|---|

TABLE 6-continued

Relates to Example 4

| °C. | h | bar | % | % | % | % | % | % | % | % | g/l | g/l | mg/l | g/l | mg/l | mg/l | g/l |
|---|---|---|---|---|---|---|---|---|---|---|---|---|---|---|---|---|---|
| 25 |  |  | 10.0 | 34.4 | 7.4 | 2.5 | 3.7 | 1.2 | 0.15 | 1.4 | 8.0 | 0.198 |  | 29.6 | <100 | 54 | 0.19 |
| 100 |  |  | 9.6 | 35.2 | 7.3 | 2.4 | 3.8 | 0.76 | 0.15 | 1.6 | 10.0 | 2.24 |  | 24.1 | 100 | 58 | 0.24 |
| 150 |  |  | 9.0 | 35.2 | 7.6 | 2.5 | 3.6 | 0.26 | 0.17 | 1.4 | 10.0 | 1.32 |  | 25.2 | 260 | 40 | 0.21 |
| 200 | 0 | 2 | 8.1 | 33.5 | 8.3 | 2.7 | 3.0 | 1.8 | 0.16 | 2.0 | 13.0 | 3.16 |  | 24.4 | 1080 | 60 | 0.38 |
| 200 | 0.5 | 2 | 7.9 | 34.4 | 8.3 | 2.2 | 2.8 | 1.7 | 0.18 | 2.0 | 13.0 | 0.84 |  | 26.7 | 1360 | 42 | 0.31 |
| 200 | 1 | 2 | 7.6 | 34.0 | 8.1 | 2.6 | 2.9 | 1.6 | 0.17 | 2.0 | 14.0 | 1.0 |  | 25.4 | 1340 | 44 | 0.35 |
| 200 | 2 | 2 | 6.8 | 35.2 | 7.8 | 2.7 | 2.8 | 1.6 | 0.18 | 1.4 | 14.0 | 0.58 |  | 26.5 | 1220 | 52 | 0.40 |
| 200 | 4 | 2 | 5.0 | 40.8 | 7.0 | 2.8 | 3.1 | 1.8 | 0.14 | 1.2 | 18.0 | 0.36 |  | 24.1 | 1160 | 96 | 0.83 |
| 200 | 6 | 2 | 3.1 | 46.0 | 5.5 | 3.2 | 3.5 | 1.8 | 0.11 | 0.6 | 21.0 | 0.32 |  | 27.5 | 1100 | 180 | 1.5 |

| X-ray diffraction of final precipitate | t h | PbSO$_4$ % | SiO$_2$ % | ZnFe$_2$O$_4$ % | CaSO$_4$ % | Jaros. % | Fe$_2$O$_3$ % |  |
|---|---|---|---|---|---|---|---|---|
| Fe$_2$O$_3$, ZnFe$_2$O$_4$, SiO$_2$, jarosite | 6 | 4.7 | 3.5 | 11.4 | 6.1 | 26.9 | 44.9 | Σ = 97.5% |

TABLE 7

Relates to Example 5

Starting material

| 200 g of ferritic leach residue | Zn % | Fe % | Pb % | S % | SiO$_2$ % |
|---|---|---|---|---|---|
|  | 19.2 | 38.0 | 6.7 | 1.9 | 4.0 |

| 600 g jarosite precipitate | Pb % | Fe % | Ca % | Zn % | SiO$_2$ % | S % |
|---|---|---|---|---|---|---|
|  | 3.2 | 25.2 | 4.2 | 1.9 | 3.0 | 13.6 |

40 g Fe$_2$(SO$_4$)$_3$
V = 2 l
200 g ZnSO$_4$.7H$_2$O

| T °C. | t h | P$_{O2}$ bar | Zn % | Fe % | S % | Pb % | SiO$_2$ % | Ca % | Zn g/l | Fe$_{total}$ g/l | Fe$^{2+}$ g/l | H$_2$SO$_4$ g/l | SiO$_2$ g/l |
|---|---|---|---|---|---|---|---|---|---|---|---|---|---|
| 240 | 0 | 0 |  |  |  |  |  |  |  |  |  |  |  |
| 240 | 0.5 | 0 | 4.6 | 42.6 | 5.7 | 6.7 |  |  | 26.5 | 5.5 | 5.2 | 27.8 |  |
| 240 | 1 | 0 | 2.2 | 44.0 | 5.9 | 6.8 |  |  | 34.3 | 5.8 | 5.7 | 26.5 |  |
| 240 | 2 | 0 | 0.68 | 44.0 | 5.9 | 6.5 |  | 4.8 | 33.0 | 5.8 | 5.4 | 18.6 |  |

| X-ray diffraction of final precipitate | t h | PbSO$_4$ % | SiO$_2$ % | ZnFe$_2$O$_4$ % | CaSO$_4$ % | Jaros. % | Fe$_2$O$_3$ % |
|---|---|---|---|---|---|---|---|
| α-Fe$_2$O$_3$ | 0 |  |  |  |  |  |  |
| PbSO$_4$ | 0.5 |  |  |  |  |  |  |
| CaSO$_4$ | 1 |  |  |  |  |  |  |
|  | 2 | 9.5 |  | 2.5 | 16.3 | 8.0 | 57.3 Σ = 93.6% |

TABLE 8

Relates to Example 6

Starting material

| 200 g of ferritic leach residue | Zn % | Fe % | Pb % | S % | SiO$_2$ % |
|---|---|---|---|---|---|
|  | 19.2 | 38.0 | 6.7 | 1.9 | 4.0 |

| 400 g of jarosite precipitate | Pb % | Fe % | Ca % | Zn % | SiO$_2$ % | S % |
|---|---|---|---|---|---|---|
|  | 3.2 | 25.2 | 4.2 | 1.9 | 3.0 | 13.6 |

40 g Fe$_2$(SO$_4$)$_3$
V = 2 l [H$_2$SO$_4$] = 30 g/l
200 g ZnSO$_4$.7H$_2$O

| T °C. | t h | P$_{O2}$ bar | Zn % | Fe % | S % | Pb % | SiO$_2$ % | Ca % | Zn g/l | Fe$_{total}$ g/l | Fe$^{2+}$ g/l | H$_2$SO$_4$ g/l | SiO$_2$ g/l |
|---|---|---|---|---|---|---|---|---|---|---|---|---|---|
| 240 | 0 | 0 |  |  |  |  |  |  |  |  |  |  |  |
| 240 | 0.5 | 0 | 7.8 | 36.0 | 9.2 | 6.3 |  |  | 27.0 | 7.8 | 7.1 | 27.0 |  |
| 240 | 1 | 0 | 2.1 | 41.0 | 6.3 | 7.4 |  |  | 30.0 | 6.2 | 6.1 | 29.6 |  |
| 240 | 2 | 0 | 0.6 | 45.0 | 5.4 | 7.4 |  | 3.9 | 34.4 | 8.4 | 8.2 | 21.2 |  |

| X-ray diffraction of final precipitate | t h | PbSO$_4$ % | SiO$_2$ % | ZnFe$_2$O$_4$ % | CaSO$_4$ % | Jaros. % | Fe$_2$O$_3$ % |
|---|---|---|---|---|---|---|---|
| α-Fe$_2$O$_3$ | 0 |  |  |  |  |  |  |
| PbSO$_4$ | 0.5 |  |  |  |  |  |  |
| CaSO$_4$ | 1 |  |  |  |  |  |  |
|  | 2 | 10.8 |  | 2.2 | 13.3 | 8.6 | 58.6 Σ = 93.5 |

TABLE 9
Relates to Example 7

Starting material

| 200 g of ferritic leach residue | Zn % | Fe % | Pb % | S % | SiO$_2$ % |
|---|---|---|---|---|---|
| | 21.8 | 38.0 | 4.6 | 1.2 | 2.4 |

150 g Fe$_2$(SO$_4$)$_3$
V = 2 l [H$_2$SO$_4$] = 45 g/l
200 g ZnSO$_4$.7H$_2$O

| T °C. | t h | P$_{O_2}$ bar | Zn % | Fe % | S % | Pb % | SiO$_2$ % | Ca % | Zn g/l | Fe$_{total}$ g/l | Fe$^{2+}$ mg/l | H$_2$SO$_4$ g/l | SiO$_2$ mg/l |
|---|---|---|---|---|---|---|---|---|---|---|---|---|---|
| 25 | — | — | 20.8 | 41.2 | 0.99 | 4.5 | 3.0 | 0.08 | 20.0 | 18.0 | 270 | 44.5 | 50 |
| 100 | — | — | 20.8 | 40.0 | 1.1 | 4.8 | 2.7 | 0.08 | 21.5 | 20.0 | 270 | 37.7 | 90 |
| 150 | — | — | 19.6 | 39.6 | 1.9 | 4.8 | 2.6 | 0.07 | 23.5 | 22.0 | 180 | 34.1 | 260 |
| 240 | 0 | 2 | 11.2 | 39.6 | 6.1 | 3.5 | 1.0 | 0.04 | 33.5 | 9.4 | 1.1 | 61.0 | 1450 |
| 240 | 0.5 | 2 | 7.2 | 44.0 | 6.5 | 3.4 | 0.84 | 0.03 | 38.5 | 2.0 | 161 | 67.6 | 1580 |
| 240 | 1 | 2 | 0.8 | 51.6 | 5.0 | 3.9 | 0.88 | 0.04 | 49.0 | 0.54 | 54 | 59.5 | 1540 |
| 240 | 2 | 2 | 0.44 | 58.8 | 2.6 | 4.2 | 1.0 | 0.03 | 41.0 | 0.43 | 54 | 70.7 | 1520 |
| 240 | 3 | 2 | 0.36 | 60.0 | 2.0 | 4.5 | 0.99 | 0.03 | 47.0 | 0.25 | 72 | 64.7 | 1400 | total pressure = 36–37 bar

| X-ray diffraction of final precipitate | t h | PbSO$_4$ % | SiO$_2$ % | ZnFe$_2$O$_4$ % | Jaros. % | Fe$_2$O$_3$ % | |
|---|---|---|---|---|---|---|---|
| α-Fe$_2$O$_3$ | (25° C.) | 6.6 | 3.0 | 76.8 | 2.2 | 6.9 | Σ = 95.5 |
| PbSO$_4$ | 3 | 6.6 | 1.0 | 1.3 | 9.9 | 80.0 | Σ = 98.8% |

TABLE 10
Relates to Example 7

Starting material

| 200 g of ferritic leach residue | Zn % | Fe % | Pb % | S % | SiO$_2$ % |
|---|---|---|---|---|---|
| | 21.8 | 38.0 | 4.6 | 1.2 | 2.4 |

150 g Fe$_2$(SO$_4$)$_3$
V + 2 l [H$_2$SO$_4$] = 45 g/l
200 g ZnSO$_4$.7H$_2$O

| T °C. | t h | P$_{O_2}$ bar | Zn % | Fe % | S % | Pb % | SiO$_2$ % | Ca % | Zn g/l | Fe$_{total}$ g/l | Fe$^{2+}$ mg/l | H$_2$SO$_4$ g/l | SiO$_2$ mg/l |
|---|---|---|---|---|---|---|---|---|---|---|---|---|---|
| 25 | | | 20.8 | 39.6 | 1.2 | 4.2 | 3.0 | 0.08 | 23 | 18.6 | | 46 | 120 |
| 100 | | | 21.4 | 39.6 | 1.2 | 5.0 | 2.4 | 0.06 | 24 | 18.6 | | 33 | 180 |
| 150 | | | 19.2 | 39.2 | 2.7 | 4.5 | 2.4 | 0.06 | 25 | 19 | | 33 | 260 |
| 220 | 0 | 2 | 13.4 | 39.2 | 6.5 | 3.4 | 0.98 | 0.03 | 28 | 6.4 | | 53 | 1040 |
| 220 | 0.5 | 2 | 10.6 | 39.0 | 7.4 | 3.0 | 0.80 | 0.03 | 31 | 2.4 | | 56 | 1300 |
| 220 | 1 | 2 | 9.6 | 41.5 | 6.8 | 3.1 | 1.0 | 0.03 | 34 | 2.0 | | 60 | 1320 |
| 220 | 2 | 2 | 2.2 | 50.4 | 5.1 | 3.6 | 1.0 | 0.03 | 40 | 0.74 | | 51 | 1240 |
| 220 | 3 | 2 | 0.56 | 54.0 | 4.2 | 3.9 | 1.2 | 0.04 | 46 | 0.44 | | 48 | 1300 |

| X-ray diffraction of final precipitate | t h | PbSO$_4$ % | SiO$_2$ % | ZnFe$_2$O$_4$ % | Jaros. % | Fe$_2$O$_3$ % | |
|---|---|---|---|---|---|---|---|
| Fe$_2$O$_3$, jarosite | 3 | 5.7 | 1.2 | 2.1 | 27.2 | 62.4 | Σ = 98.6% |

TABLE 11
Relates to Example 7

Starting material

| 200 g of ferritic leach residue | Zn % | Fe % | Pb % | S % | SiO$_2$ % |
|---|---|---|---|---|---|
| | 21.8 | 38.0 | 4.6 | 1.2 | 2.4 |

35 g Na$_2$SO$_4$
150 g Fe$_2$(SO$_4$)$_3$
V = 2 l [H$_2$SO$_4$] = 45 g/l
200 g ZnSO$_4$.7H$_2$O

| T °C. | t h | P$_{O_2}$ bar | Zn % | Fe % | S % | Pb % | SiO$_2$ % | Ca % | Na % | Ag g/l | Zn g/l | Fe$_{total}$ g/l | Fe$^{2+}$ mg/l | H$_2$SO$_4$ g/l | SiO$_2$ mg/l | Na g/l |
|---|---|---|---|---|---|---|---|---|---|---|---|---|---|---|---|---|
| 25 | | | 19.9 | 40 | 1.1 | 4.3 | 3.3 | | 0.02 | 150 | 20.8 | 18.0 | | 56 | <100 | 5.0 |
| 100 | | | 20.8 | 39 | 1.2 | 5.0 | 3.1 | | 0.01 | | 21.0 | 19.0 | | 39 | <100 | 5.0 |
| 150 | | | 15.6 | 38 | 4.1 | 4.0 | 2.4 | | 0.56 | | 22.8 | 14.6 | | 42 | 200 | 4.6 |
| 220 | 0 | 2 | 9.7 | 38 | 7.0 | 3.2 | 1.2 | | 1.5 | 150 | 29.6 | 4.4 | | 58 | 1450 | 3.3 |
| 220 | 0.5 | 2 | 8.4 | 37 | 7.8 | 3.0 | 0.9 | | 1.8 | | 29.8 | 1.1 | 99 | 58 | 1300 | 2.9 |
| 220 | 1 | 2 | 8.0 | 37 | 8.2 | 3.0 | 1.0 | | 1.9 | | 31.2 | 0.80 | 71 | 55 | 1300 | 2.6 |
| 220 | 2 | 2 | 7.6 | 37 | 8.3 | 2.9 | 0.9 | | 1.9 | | 32.4 | 0.85 | 72 | 57 | 1350 | 2.6 |
| 220 | 3 | 2 | 7.3 | 37 | 8.3 | 3.0 | 1.1 | | 2.1 | 100 | 32.6 | 0.95 | 63 | 56 | 1400 | 2.6 |

| X-ray diffraction of final precipitate | t h | PbSO$_4$ % | SiO$_2$ % | ZnFe$_2$O$_4$ % | Jaros. % | Fe$_2$O$_3$ % |
|---|---|---|---|---|---|---|

TABLE 11-continued

| | | | | Relates to Example 7 | | | |
|---|---|---|---|---|---|---|---|
| Jarosite, ZnFe$_2$O$_4$, Fe$_2$O$_3$ | 3 | 4.4 | 1.1 | 26.9 | 59.2 | 5.8 | Σ = 97.4% |

TABLE 12

| | | | | | | Relates to Example 7 | | | | | | | | | |
|---|---|---|---|---|---|---|---|---|---|---|---|---|---|---|---|
| Starting material | | | | | | | | | | | | | | | |
| 200 g of ferritic leach residue | | | | Zn % | | | Fe % | | | Pb % | | S % | | SiO$_2$ % | |
| | | | | 21.8 | | | 38.0 | | | 4.6 | | 1.2 | | 2.4 | |

35 g Na$_2$SO$_4$
150 g Fe$_2$(SO$_4$)$_3$
V = 2 l [H$_2$SO$_4$] = 45 g/l
200 g ZnSO$_4$·7H$_2$O

| T °C. | t h | P$_{O2}$ bar | Zn % | Fe % | S % | Pb % | SiO$_2$ % | Ca % | Na % | Ag g/l | Zn g/l | Fe$_{total}$ g/l | Fe$^{2+}$ mg/l | H$_2$SO$_4$ g/l | SiO$_2$ mg/l | Na g/l |
|---|---|---|---|---|---|---|---|---|---|---|---|---|---|---|---|---|
| 25 | | | 20.9 | 40 | 1.0 | 4.6 | 3.0 | | 0.01 | 150 | 20.0 | 18.2 | | 43 | <100 | 5.0 |
| 100 | | | 21.2 | 40 | 1.1 | 5.0 | 3.2 | | 0.01 | | 22.0 | 20.0 | | 36 | <100 | 5.0 |
| 150 | | | 14.6 | 38 | 4.6 | 3.7 | 2.2 | | 0.007 | | 23.0 | 11.6 | | 47 | 250 | 4.3 |
| 240 | 0 | 2 | 9.3 | 37 | 7.3 | 3.3 | 1.1 | | 1.6 | 80 | 33.0 | 6.2 | 227 | 57 | 1450 | 3.7 |
| 240 | 0.5 | 2 | 7.9 | 37 | 8.0 | 3.1 | 0.9 | | 1.8 | | 32.0 | 1.2 | 18 | 58 | 1550 | 3.0 |
| 240 | 1 | 2 | 7.0 | 38 | 8.3 | 3.0 | 0.9 | | 1.9 | | 34.0 | 1.1 | 18 | 55 | 1550 | 3.0 |
| 240 | 2 | 2 | 1.8 | 42 | 8.1 | 3.3 | 1.1 | | 1.9 | | 47.0 | 0.55 | | 49 | 1600 | 3.5 |
| 240 | 3 | 2 | 0.72 | 55 | 3.4 | 3.9 | 1.4 | | 0.56 | 70 | 49.0 | 0.6 | 9 | 60 | 1500 | 5.6 |

| X-ray diffraction of final precipitate | t h | PbSO$_4$ % | SiO$_2$ % | ZnFe$_2$O$_4$ % | Jaros. % | Fe$_2$O$_3$ % | |
|---|---|---|---|---|---|---|---|
| Jarosite, Fe$_2$O$_3$, PbSO$_4$ | 3 | 5.7 | 1.4 | 2.7 | 21.2 | 66.4 | Σ = 97.4% |

TABLE 13

| | | | | | | Relates to Example 7 | | | | | | | | | |
|---|---|---|---|---|---|---|---|---|---|---|---|---|---|---|---|
| Starting material | | | | | | | | | | | | | | | |
| 200 g of ferritic leach residue | | | | Zn % | | | Fe % | | | Pb % | | S % | | SiO$_2$ % | |
| | | | | 21.8 | | | 38.0 | | | 4.6 | | 1.2 | | 2.4 | |

30 g (NH$_4$)$_2$SO$_4$
150 g Fe$_2$(SO$_4$)$_3$
V = 2 l [H$_2$SO$_4$] = 45 g/l
200 g ZnSO$_4$·7H$_2$O

| T °C. | t h | P$_{O2}$ bar | Zn % | Fe % | S % | Pb % | SiO$_2$ % | Ca % | NH$_4$ % | Zn g/l | Fe$_{total}$ g/l | Fe$^{2+}$ mg/l | H$_2$SO$_4$ g/l | SiO$_2$ mg/l | NH$_4$ g/l |
|---|---|---|---|---|---|---|---|---|---|---|---|---|---|---|---|
| 25 | | | 20.4 | 40.0 | 1.0 | 4.2 | 3.2 | | 0.02 | 20.0 | 17.6 | | 41 | <100 | 3.7 |
| 100 | | | 21.2 | 41.2 | 1.1 | 4.8 | 3.1 | | 0.02 | 21.0 | 19.8 | | 35 | <100 | 3.7 |
| 150 | | | 14.6 | 38.0 | 4.8 | 3.5 | 2.2 | | 0.6 | 22.0 | 10.6 | | 45 | 200 | 2.9 |
| 240 | 0 | 2 | 10.6 | 38.0 | 6.8 | 3.3 | 1.0 | | 1.1 | 30.0 | 5.6 | 2560 | 61 | 1300 | 2.6 |
| 240 | 0.5 | 2 | 9.6 | 38.8 | 7.2 | 3.2 | 0.9 | | 1.3 | 30.0 | 1.5 | 45 | 65 | 1450 | 2.3 |
| 240 | 1 | 2 | 8.8 | 38.8 | 7.3 | 3.2 | 1.1 | | 1.3 | 33.0 | 1.5 | | 61 | 1500 | 2.3 |
| 240 | 2 | 2 | 2.7 | 46.0 | 6.5 | 3.5 | 1.2 | | 1.0 | 47.0 | 0.76 | | 54 | 1550 | 3.4 |
| 240 | 3 | 2 | 0.61 | 58.4 | 2.0 | 4.2 | 1.4 | | 0.04 | 50.0 | 0.32 | | 62 | 1400 | 4.2 |

| X-ray diffraction of final precipitate | t h | PbSO$_4$ % | SiO$_2$ % | ZnFe$_2$O$_4$ % | Jaros. % | Fe$_2$O$_3$ % | |
|---|---|---|---|---|---|---|---|
| α-Fe$_2$O$_3$ PbSO$_4$ | 3 | 6.1 | 1.4 | 2.3 | 10.2 | 77.0 | Σ = 97% |

What is claimed is:

1. A hydrometallurgical process for the treatment of a raw material which contains an oxide and a ferrite of at least one element selected from the group comprising zinc, copper and cadmium, comprising: neutral leaching the raw material by means of a sulfuric-acid-bearing solution in order to leach the oxide without substantial dissolving of ferrite; separating a ferrite-bearing residue; mixing a sulfuric-acid-bearing or ferrisulfate-bearing solution or a mixed solution with the residue in such a quantity that approximately 50–60% of the ferrite dissolves and its iron is precipitated as jarosite in the presence of alkali or ammonium ions under atmospheric conditions at 80°–105° C.; separating a solid phase from the solution; and treating a slurry of the solid phase at such elevated pressure and temperature that the zinc of the solid phase is converted to zinc sulfate and the iron to hematite in accordance with the following reaction:

(5) $3ZnFe_2O_{4(s)} + 2A[Fe_3(SO_4)_2(OH)_6]_{(s)} \rightarrow 3ZnSO_{4(aq)} + A_2SO_{4(aq)} + 6Fe_2O_{3(s)} + 6H_2O_{(aq)}$ (A = K, Na, NH$_4$)

2. The process of claim 1, comprising treating the slurry of the solid phase at 220°–250° C.

3. The process of claim 1 or 2, comprising treating the slurry of the solid phase at an oxygen pressure of 1–2 bar in order to maintain the iron in trivalent state.

4. The process of claim 1, comprising mixing so much sulfuric-acid bearing or ferrisulfate-bearing solution with the ferrite-bearing residue that the concentration of sulfuric acid in the solution at the end of this stage is approximately 20–40 kg/m$^3$.

* * * * *